United States Patent
Tokunaga et al.

(10) Patent No.: US 8,476,381 B2
(45) Date of Patent: Jul. 2, 2013

(54) METHOD FOR PRODUCING CRYSTALLINE POLYOXYALKYLENE POLYOL, AND RESIN OBTAINED BY USING THE SAME AS RAW MATERIAL

(75) Inventors: Hironobu Tokunaga, Kyoto (JP); Ichiro Yamada, Fukushima (JP); Yuko Hamano, Tokushima (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 454 days.

(21) Appl. No.: 12/594,837

(22) PCT Filed: Apr. 24, 2008

(86) PCT No.: PCT/JP2008/057913
§ 371 (c)(1),
(2), (4) Date: Nov. 9, 2009

(87) PCT Pub. No.: WO2008/136343
PCT Pub. Date: Nov. 13, 2008

(65) Prior Publication Data
US 2010/0120996 A1 May 13, 2010

(30) Foreign Application Priority Data
Apr. 26, 2007 (JP) ................................. 2007-117439

(51) Int. Cl.
*C08G 59/14* (2006.01)
(52) U.S. Cl.
USPC ..................................................... 525/528
(58) Field of Classification Search
None
See application file for complete search history.

(56) References Cited

U.S. PATENT DOCUMENTS

| | | | |
|---|---|---|---|
| 5,426,081 A * | 6/1995 | Le-Khac | 502/154 |
| 5,498,583 A | 3/1996 | Le-Khac | |
| 5,523,386 A | 6/1996 | Le-Khac | |
| 5,525,565 A | 6/1996 | Le-Khac | |
| 5,527,880 A | 6/1996 | Le-Khac | |
| 5,596,075 A | 1/1997 | Le-Khac | |
| 5,641,858 A | 6/1997 | Le-Khac | |
| 5,652,329 A | 7/1997 | Le-Khac | |
| 6,458,918 B1 * | 10/2002 | Schafer et al. | 528/415 |

FOREIGN PATENT DOCUMENTS

| | | |
|---|---|---|
| JP | 6-248068 | 9/1994 |
| JP | 7-278275 | 10/1995 |
| JP | 11-012353 | 1/1999 |
| JP | 2001-521957 | 11/2001 |
| JP | 2004-315588 | 11/2004 |
| WO | WO2006/099162 A2 * | 9/2006 |

OTHER PUBLICATIONS

Schoen et al., Gas-Phase and Solution-Phase Polymerization of Epoxides by Cr(salen) Complexes: Evidence for a Dinuclear Cationic Mechanism, Inorganic Chemistry, Oct. 26, 2004, 43(23), p. 7278-7280.*
A Highly Active, IsospecifiC Cobalt Catalyst for Propylene Oxide Polymerization Kabhryn L Peretti, Hiroharu Ajim, Claire T. Cohen, Emil B. Lobkovs. ky, and Geoffrey W. Coates Department of Chemistry and Chemical Biology, Baker Laboratory, Cornel/University. Ithaca, New York 14853-1301.*
Jim Clark, The Effect of Surface Area on Reaction Rates, 2002, Chemguide.co.uk, pp. 1-3.*
Peretti et al., "A Highly Active, Isospecific Cobalt Catalyst for Propylene Oxide Polymerization" Journal of the American Chemical Society, vol. 127, No. 33, pp. 11566-11567, 2005.
Schon et al., "Gas-Phase and Solution-Phase Polymerization of Epoxides by Cr(salen) Complexes: Evidence for a Dinuclear Cationic Mechanism" Inorganic Chemistry, vol. 43, No. 23, pp. 7278-7280, along with Supplemental Material, 2004.
Tokunaga et al., "Asymmetric Catalysis with Water: Efficient Kinetic Resolution of Terminal Epoxides by Means of Catalytic Hydrolysis" Science, vol. 277, pp. 936-938, 1997.
International Search Report issued with respect to PCT/JP2008/057913, mailed Jul. 22, 2008.
English language abstract for DE 19748359 (A1) (corresponding to JP 2001-521957, Nov. 13, 2001).

* cited by examiner

*Primary Examiner* — Randy Gulakowski
*Assistant Examiner* — Jeffrey Washville
(74) *Attorney, Agent, or Firm* — Greenblum & Bernstein, P.L.C.

(57) ABSTRACT

The present invention has its object to produce a highly reactive crystalline polyoxyalkylene polyol with a very high isotacticity at low cost, and provide polyurethane resins, and polyester resins which are excellent in sharp meltability. The present invention relates to a method for producing a crystalline polyoxyalkylene polyol having a number average molecular weight of 500 to 20,000 including performing ring-opening polymerization of an alkylene oxide (a) in the presence of a salen complex (B), the crystalline polyoxyalkylene polyol (A), and a polyurethane resin and a polyester resin produced by the crystalline polyoxyalkylene polyol (A).

12 Claims, No Drawings

METHOD FOR PRODUCING CRYSTALLINE POLYOXYALKYLENE POLYOL, AND RESIN OBTAINED BY USING THE SAME AS RAW MATERIAL

TECHNICAL FIELD

The present invention relates to a method for producing a crystalline polyoxyalkylene polyol. The present invention also relates to a crystalline polyoxyalkylene polyol usable for producing a polyurethane resin and a polyester resin excellent in sharp meltability, as well as the polyurethane resin and the polyester resin therefrom.

BACKGROUND ART

As methods for producing crystalline polyoxyalkylene polyols with a high isotacticity via ring-opening polymerization of alkylene oxides, various methods using catalysts have been known.

For example, a method which includes ring-opening polymerization of a chiral alkylene oxide in the presence of a catalyst commonly used to polymerize alkylene oxides (see Non-Patent Document 1), and a method which includes ring-opening polymerization of a inexpensive racemic alkylene oxide in the presence of a complex catalyst which has a particular bulky chemical structure, have been known in the art.

As the method involving particular catalysts, some methods are known, which includes use of a catalyst prepared by contacting a lanthanoid complex with an organic aluminum (see, for example, Patent Document 1), and which includes reacting, in advance, a hydroxy compound with a bimetallic μ-oxoalkoxide (see, for example, Patent Document 2).

Also known is a method for producing a polyoxyalkylene polyol with a very high isotacticity, which includes use of a salen complex as a catalyst (See, for example, Non-Patent Document 2).

However, methods, for example, including ring-opening polymerization of a chiral alkylene oxide are disadvantageous in cost because the method requires industrially-expensive chiral alkylene oxide.

The method using a racemic alkylene oxide and a particular catalyst is also disadvantageous in cost. The method requires a large amount of the complex catalyst which is unrecoverable in an active state, although the complex catalyst used in the method is expensive. Thus, the method is disadvantageous in cost. In addition, a crystalline polyoxyalkylene polyol produced by this method is insufficient in isotacticity.

The above method using a salen complex as a catalyst provides polyoxyalkylene polyols having an ester moiety at one end, and having a molecular weight of 52,000 or larger. Thus, the product polyoxyalkylene polyols are inconvenient to use as a raw material of a diol component for producing polyurethane resins, polyester resins, and the like, in view of poor reactivity.

Patent Document 1: JP-A 11-12353
Patent Document 2: JP-T 2001-521957
Non-Patent Document 1: Journal of the American Chemical Society, 1956, Vol. 78, No. 18, p. 4787-4792
Non-Patent Document 2: Journal of the American Chemical Society, 2005, Vol. 127, No. 33, p. 11566-11567

DISCLOSURE OF THE INVENTION

Problems to be Solved by the Invention

The present invention has an object to produce a highly reactive crystalline polyoxyalkylene polyol having a very high isotacticity at low cost. The present invention has another object to provide a crystalline polyoxyalkylene polyol usable for producing polyurethane resins and polyester resins excellent in sharp meltability, at low cost.

Means for Solving the Problem

The present inventors have intensively studied to solve the problem, and have completed the present invention.

That is, the present invention relates to:

(1) a method for producing a crystalline polyoxyalkylene polyol (A1) having a number average molecular weight of 500 to 20,000, including: performing ring-opening polymerization of an alkylene oxide (a) in the presence of a salen complex (B) represented by the formula (1) or the formula (2) in a condition that an amount of the salen complex is 6 to 100 parts by weight with respect to 100 parts by weight of the alkylene oxide (a);

(2) a method for producing a crystalline polyoxyalkylene polyol (A2) having a number average molecular weight of 500 to 20,000, including: performing ring-opening polymerization of an alkylene oxide (a) in the presence of a salen complex (B) represented by the formula (1) or the formula (2), and an acid (C);

(3) a crystalline polyoxyalkylene polyol (A) produced by any one of the above production methods;

(4) a polyurethane resin (PU) produced via reaction of the crystalline polyoxyalkylene polyol (A) produced by any one of the above production methods, and a polyisocyanate (E); and (5) a polyester resin (PE) produced via reaction of the crystalline polyoxyalkylene polyol (A) produced by any one of the above production methods, and a polycarboxylic acid (F).

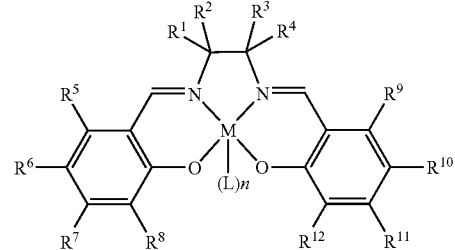

(1)

In the formula (1), $R^1$ to $R^4$ each independently represent a hydrogen atom, or an aliphatic, alicyclic, aromatic, or aromatic aliphatic hydrocarbon group, or a halogen atom, or any pair of the $R^1$ to $R^4$ may be linked together to form a ring. A hydrogen atom or hydrogen atoms bonded to a carbon atom in the hydrocarbon group may be substituted or unsubstituted. $R^5$ to $R^{12}$ each independently represent a hydrogen atom, or an aliphatic, alicyclic, aromatic, or aromatic aliphatic hydrocarbon group, or a halogen atom, or any adjacent pair of the $R^5$ to $R^{12}$ may be linked together to form a ring. A hydrogen atom or hydrogen atoms bonded to a carbon atom in the hydrocarbon group may be substituted or unsubstituted. M represents a metal atom belonging to any one of groups III to XIII. L represents a ligand, and n represents an integer of 1 or 2. When n is 2, one ligand L of two Ls may be the same as or different from the other.

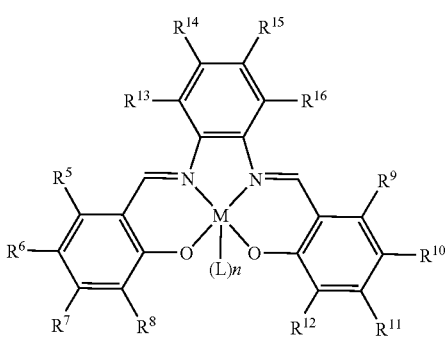

(2)

In the formula (2), $R^{13}$ to $R^{16}$ each independently represent a hydrogen atom, or an aliphatic, alicyclic, aromatic, or aromatic aliphatic hydrocarbon group, a halogen atom, or any pair of the $R^{13}$ to $R^{16}$ may be linked together to form a ring. A hydrogen atom or hydrogen atoms bonded to a carbon atom in the hydrocarbon group may be substituted or unsubstituted. $R^5$ to $R^{12}$, M, L, and n represent the same as defined in the formula (1).

The molar ratio (C)/(B) of the acid (C) to the salen complex (B) is preferably 0.1 to 200.

When the ring-opening polymerization of the alkylene oxide (a) is performed in the presence of the salen complex (B), and the acid (C), the amount of the salen complex is preferably 0.02 to 5 parts by weight with respect to 100 parts by weight of the alkylene oxide (a).

The acid (c) is preferably an organic acid.

The isotacticity of the crystalline polyoxyalkylene polyol (A) is preferably 95% or higher.

The crystalline polyoxyalkylene polyol (A) is preferably a crystalline polyoxypropylene polyol.

The salen complex (B) is preferably immobilized on a solid carrier (D).

The solid carrier (D) is preferably an inorganic solid material, or an organic polymer.

The crystalline polyoxyalkylene polyol (A) of the present invention is produced via ring-opening polymerization of a racemic alkylene oxide (a) described below in the presence of the salen complex (B). The number average molecular weight of polyol (A) lies in the range of from 500 to 20,000, which is suitable as a raw material for a polyurethane resin and a polyester resin.

The first aspect of the present invention is a method for producing a crystalline polyoxyalkylene polyol (A1) having a number average molecular weight of 500 to 20,000. The method includes performing ring-opening polymerization of an alkylene oxide (a) in the presence of a salen complex (B) represented by the formula (1) or the formula (2) in a condition that an amount of the salen complex is 6 to 100 parts by weight with respect to 100 parts by weight of the alkylene oxide (a).

It is not necessary to use a chiral material as the alkylene oxide (a), and normal racemate may be used. Examples of the alkylene oxide (a) include $C_3$ to $C_9$ alkylene oxides, which will be listed below.

Examples of the $C_3$ to $C_9$ alkylene oxides include $C_3$ alkylene oxides, such as propylene oxide, 1-chlorooxetane, 2-chlorooxetane, 1,2-dichlorooxetane, epichlorohydrin, and epibromohydrin; $C_4$ alkylene oxides, such as 1,2-butylene oxide, and methyl glycidyl ether; $C_5$ alkylene oxides, such as 1,2-pentylene oxide, 2,3-pentylene oxide, and 3-methyl-1,2-butylene oxide; $C_6$ alkylene oxides, such as cyclohexene oxide, 1,2-hexylene oxide, 3-methyl-1,2-pentylene oxide, 2,3-hexylene oxide, 4-methyl-2,3-pentylene oxide, and allyl glycidyl ether; $C_7$ alkylene oxides, such as 1,2-heptylene oxide; $C_8$ alkylene oxides, such as styrene oxide; and $C_9$ alkylene oxides, such as phenyl glycidyl ether.

Among these racemic alkylene oxides, propylene oxide, 1,2-butylene oxide, styrene oxide, and cyclohexene oxide are preferable. Propylene oxide, 1,2-butylene oxide, and cyclohexene oxide are more preferable. In view of the polymerization rate, propylene oxide is most preferable.

One of these alkylene oxides may be used alone, or two or more of these may be used in combination.

The salen complex (B) to be used in the present invention is a complex represented by the following formula (1) or (2).

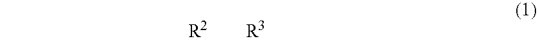

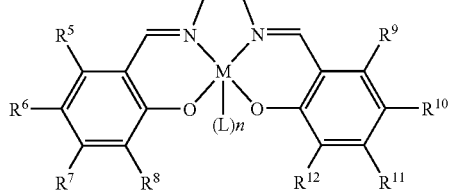

In the formula, $R^1$ to $R^4$ each independently represent a hydrogen atom, or an aliphatic, alicyclic, aromatic, or aromatic aliphatic hydrocarbon group, or a halogen atom, or any pair of the $R^1$ to $R^4$ may be linked together to form a ring. Hydrogen atoms bonded to a carbon atom in the hydrocarbon group may be substituted by substituents that will not be involved in the polymerization reaction of the alkylene oxide (such a substituent may be, for example, a halogen atom, an organic silyl group, an alkoxy group, or an aryloxy group).

Examples of the aliphatic hydrocarbon group include methyl, ethyl, propyl, butyl, pentyl, hexyl, heptyl, octyl, nonatyl, dodecyl, iso-propyl, iso-butyl, sec-butyl, tert-butyl, iso-pentyl, sec-pentyl, neopentyl, 2-ethylhexyl, and sec-octyl. Among these, ethyl, propyl, butyl, iso-propyl, iso-butyl, sec-butyl, and tert-butyl are preferable. In particular, ethyl, and iso-propyl are preferable. In view of the isotacticity of the crystalline polyoxyalkylene polyol to be produced, ethyl is most preferable.

Examples of the alicyclic hydrocarbon group include cyclopentyl, cyclohexyl, cycloheptyl, and cyclooctyl.

Examples of the aromatic, or aromatic aliphatic hydrocarbon group include monocyclic aromatic hydrocarbon groups, and polycyclic aromatic hydrocarbons groups.

Examples of the monocyclic aromatic hydrocarbon groups include phenyl, tolyl, mesityl, cumenyl, benzyl, phenethyl, methylbenzyl, xylyl, 2,4-dimethoxyphenyl, and 2,5-diethoxytolyl.

Examples of the polycyclic aromatic hydrocarbon groups include pentalyl, naphthyl, anthracyl, heptalyl, phenalyl, and phenantolyl.

Any pair of the $R^1$ to $R^4$ in the formula (1) may be linked together to form a ring. The ring may be (i) a divalent 3- to 7-membered-ring hydrocarbon group formed via a linkage of any pair of the $R^1$ to $R^4$ which are each bonded to adjacent carbon atoms; (ii) a divalent spiro ring hydrocarbon group formed via a linkage of any pair of the $R^1$ to $R^4$ each bonded to the same carbon atom; or (iii) the divalent 3- to 7-membered or spiro ring partially substituted by an alicyclic group. Considering the stability of the ring, the ring (i) is more preferable than the ring (ii). Specific examples of the divalent hydrocarbon groups constituted of any pair of the $R^1$ to $R^4$ linked together include methylene, ethylene, propylene, butylene, and pentylene.

Hydrogen atoms bonded to the carbon atoms in the hydrocarbon group may be substituted by substituents that will not be involved in the polymerization reaction of the alkylene oxide. Examples of such substituents that will not be involved in the reaction herein include halogen atoms, organic silyl groups, alkoxy groups, and aryloxy groups.

When the hydrocarbon group is a linear alkyl group, specific examples of the linear alkyl group partially substituted by any one of these substituents include trichloromethyl, perfluoroethyl, 2,3-dichloropropyl, 1,2-difluorohexyl, perfluoropentyl, perchlorooctyl, trimethylsilylmethyl, trimethylsilylbutyl, triethylsilylbutyl, trimethylmethoxyethyl, phenoxyethyl, phenoxydecyl, and naphthoxyethyl.

Examples of the halogen atoms include fluorine, chlorine, bromine, and iodine.

In the formulae (1) and (2), the $R^5$ to $R^{12}$ each independently represent a hydrogen atom, or an aliphatic, alicyclic, aromatic, or aromatic aliphatic hydrocarbon group, or a halogen atom, or any adjacent pair of the $R^5$ to $R^{12}$ may be linked together to form a ring. Hydrogen atoms bonded to a carbon atom in the hydrocarbon group may be substituted by substituents which will not be involved in the polymerization reaction of the alkylene oxide (such a substituent may be, for example, a halogen atom, an organic silyl group, an alkoxy group, or an aryloxy group).

Examples of the aliphatic hydrocarbon group, the alicyclic hydrocarbon group, the aromatic, or aromatic aliphatic hydrocarbon group, and the halogen atom include those listed for the $R^1$ to $R^4$.

Any pair of the $R^5$ to $R^{12}$ in the formula (1) may be linked together to form a ring. The ring may be, for example, a divalent 3- to 7-membered hydrocarbon group formed via a linkage of any pair of the $R^5$ to $R^{12}$ bonded to adjacent carbon atoms, or such a divalent ring hydrocarbon group partially substituted by an aromatic cyclic or alicyclic group. Specific examples of the divalent hydrocarbon groups formed by any pair of the $R^5$ to $R^{12}$ linked together include methylene, ethylene, propylene, butylene, pentylene, and phenylene.

Hydrogen atoms bonded to the carbon atoms of the hydrocarbon group may be substituted by substituents that will not be involved in the polymerization reaction of the alkylene oxide. Examples of the substituent that will not be involved in the reaction herein include those listed for the $R^1$ to $R^4$.

In the formula (2), $R^{13}$ to $R^{16}$ each independently represent a hydrogen atom, or an aliphatic, alicyclic, aromatic, or aromatic aliphatic hydrocarbon group, or a halogen atom, or any pair of the $R^{13}$ to $R^{16}$ may be linked together to form a ring. Hydrogen atoms bonded to a carbon atom in the hydrocarbon group may be substituted by substituents that will not be involved in the polymerization reaction of the alkylene oxide (such a substituent may be, for example, a halogen atom, an organic silyl group, an alkoxy group, or an aryloxy group). Examples thereof include those listed for the $R^1$ to $R^4$.

Among them, preferable combinations of $R^{13}$ to $R^{16}$ are a combination in which all of $R^{13}$ to $R^{16}$ are hydrogen atoms, or a combination in which only one of the $R^{13}$ to $R^{16}$ is a methyl group, and the other are hydrogen atoms. Most preferable combination is a combination in which all of $R^{13}$ to $R^{16}$ are hydrogen atoms.

In the formula, M represents a metal atom that belongs to any one of groups III to XIII in the periodic table. Examples thereof include Al, Sc, Ti, V, Cr, Mn, Fe, Co, Ni, Cu, Zn, Ga, Y, Zr, Nb, Mo, Tc, Ru, Rh, Pd, Ag, Cd, In, Hf, Ta, W, Re, Os, Ir, Pt, Au, Hg, and Tl. Considering reactivity, Al, Cr, Fe, Mn, and Co are preferable, and Co is particularly preferable.

In the formula, L represents a ligand, and n represents an integer of 1 or 2. When n is 2, one ligand L of two Ls may be the same as or different from the other.

Examples of the ligand L of the salen complex (B) of the present invention include anionic ligands, and neutral ligands.

Preferred examples of the ligand L of the salen complex (B) include mono-, di-, tri-, or tetravalent organic carboxylate anions, such as acetate ion, hexanoate ion, trifluoroacetate ion, benzoate ion, oxalate ion, malonate ion, succinate ion, propane-1,2,3-tricarboxylate ion, citrate ion, and butane-1,2,3,4-tetracarboxylate ion; inorganic anions, such as nitrate ion, phosphate ion, $PF_6^-$, and $BF_4^-$; and water, propylene glycol, ethylene glycol, and glycerin.

In view of polymerization rate, acetate ion, benzoate ion, propane-1,2,3-tricarboxylate ion, butane-1,2,3,4-tetracarboxylate ion, and $BF_4^-$ are preferable among these.

Only one of these salen complexes (B) may be used alone, or two or more of these may be used in combination.

The salen complex (B) of the present invention may be prepared by one of known synthetic methods.

For example, the salen complex (B) may be synthesized by the method taught in the Journal of the American Chemical Society, Vol. 127, No. 33, p. 11566-11567 (published in 2005), or Science, Vol. 277, No. 5328, p. 936-938 (published in 1997).

According to the first aspect of the present invention, crystalline polyoxyalkylene polyol (A1) that has a number average molecular weight of 500 to 20,000 may be produced via ring-opening polymerization of the alkylene oxide (a) in the presence of an appropriate amount of the salen complex (B).

The amount of the salen complex (B) is 6 to 100 parts by weight with respect to 100 parts by weight of the alkylene oxide (a). If the amount is less than 6 parts by weight, the crystalline polyoxyalkylene polyol (A1) produced tends to have an excessively large molecular weight, which may not be suitable as a raw material for polyurethane resins or polyester resins. On the contrary, if the amount of the expensive catalyst exceeds 100 parts by weight, time-consuming purification procedures for removing catalyst residue may be required in the production process of the crystalline polyoxyalkylene polyol (A1). As a result, yield of the crystalline polyoxyalkylene polyol (A1) may be lowered, and this possibly leads to cost increase. The amount of the catalyst is appropriately determined depending on the purpose. The amount of the salen complex (B) is more preferably 50 to 90 parts by weight with respect to 100 parts by weight of the alkylene oxide (a).

The method for producing crystalline polyoxyalkylene polyol (A1) according to the first aspect of the present invention, which includes performing ring-opening-addition reaction of the alkylene oxide (a) with the salen complex (B), may be carried out in a similar manner to normal ring-opening-addition reaction. Examples thereof include:

(1) a method which includes gradually adding the racemic alkylene oxide (a) to a mixture of the salen complex (B), and an optional solvent (the mixture is kept regulated to a reaction temperature in advance), to allow ring-opening-addition reaction to proceed;

(2) a method which includes mixing the racemic alkylene oxide (a), the salen complex (B), and an optional solvent in advance at a temperature lower than the reaction temperature, and then heated to the reaction temperature; and (3) a method which includes performing ring-opening addition of the racemic alkylene oxide (a) in the presence of the salen complex (B), leaving the obtained product in the reaction vessel as produced, and then adding another racemic alkylene oxide (a) to allow ring-opening addition to proceed.

The reaction can be made generally at a temperature from −30° C. to 150° C. However, for uniformly controlling the isotacticity and the molecular weight, the reaction may be made preferably at a temperature from 0° C. to 120° C., and more preferably at a temperature from 15° C. to 100° C.

The method for producing crystalline polyoxyalkylene polyol (A1) according to the first aspect of the present invention, which includes reacting the salen complex (B) with the alkylene oxide (a), may be made in a suitable inactive solvent (for example, toluene, or xylene), if necessary.

When the reaction is made without any solvent, or in a mixture in a high concentration of reaction compounds, the reaction temperature becomes hard to control because of heat generation, and as a result, the molecular weight, and the isotacticity of the product may be hard to control.

The concentration and the amount of the solvent are determined so that the molecular weight, and the isotacticity of the product can be suitably controlled.

The second aspect of the present invention is a method for producing a crystalline polyoxyalkylene polyol (A2) having a number average molecular weight of 500 to 20,000, which includes performing ring-opening polymerization of an alkylene oxide (a) in the presence of the salen complex (B) represented by the formula (1) or the formula (2), and an acid (C).

Namely, the second aspect of the present invention is characterized in that ring-opening polymerization of an alkylene oxide (a) in the presence of an acid (C) in combination with a salen complex (B) enables to produce crystalline polyoxyalkylene polyol (A2) having a number average molecular weight of 500 to 20,000.

The acid (C) to be coexist together with the salen complex (B) in the present invention may be any organic acid or inorganic acid.

Examples of the organic acid include aliphatic, or aromatic carboxylic acids, such as formic acid, acetic acid, propionic acid, hexanoic acid, stearic acid, trifluoroacetic acid, benzoic acid, phthalic acid, oxalic acid, malonic acid, succinic acid, propane-1,2,3-tricarboxylic acid, citric acid, and butane-1,2,3,4-tetracarboxylic acid; and aliphatic, or aromatic sulphonic acids, such as methanesulfonic acid, benzenesulfonic acid, p-toluenesulfonic acid, and trifluoromethanesulfonic acid.

Examples of the inorganic acid include $HBF_4$, $HCl$, $H_3BO_3$, $HNO_3$, $HPH_2O_2$, $H_2PHO_4$, $H_3PO_4$, and $H_2SO_4$.

Among these, the organic acids are preferable in view of the number average molecular weight of the crystalline polyoxyalkylene polyol (A2) to be produced, and acetic acid, and benzoic acid are more preferable.

In the production method according to the second aspect of the present invention, the alkylene oxide used as a raw material, the salen complex (B) used as a catalyst, an inactive solvent optionally used in the reaction, and conditions such as the reaction temperature may be the same materials and the same conditions as those described in the method for producing crystalline polyoxyalkylene polyol (A1) of the first aspect of the present invention. The amount of the salen complex (B) to be used will be described later.

Examples of the method for producing crystalline polyoxyalkylene polyol (A2) according to the second aspect of the present invention, which includes performing ring-opening polymerization of the alkylene oxide (a) in the presence of the salen complex (B) and an acid (C), include:

(1) a method which includes gradually adding the racemic alkylene oxide (a) to a mixture of the salen complex (B), the acid (C), and an optional solvent (the mixture is kept regulated to a reaction temperature in advance), so as to allow ring-opening-addition reaction to proceed;

(2) a method which includes mixing the racemic alkylene oxide (a), the salen complex (B), the acid (C), and an optional solvent in advance at a temperature lower than the reaction temperature, and then heated to the reaction temperature; and (3) a method which includes performing ring-opening addition of the racemic alkylene oxide (a) in the presence of the salen complex (B), leaving the obtained product in a reaction vessel as produced, and then adding another racemic alkylene oxide (a) is added to allow ring-opening addition to proceed.

The method for producing crystalline polyoxyalkylene polyol (A2) of the present invention requires the acid (C) to be used in combination with the salen complex (B). In order to adjust the molecular weight of the crystalline polyalkylene polyol (A2) to be produced, the molar ratio ((C)/(B)) of the acid (C) to the salen complex (B) is preferably 0.1 to 200, more preferably 1 to 150, and still more preferably 50 to 150. If the molar ratio (C)/(B) is less than 0.1, the molecular weight of the produced polyoxyalkylene polyol (A2) tend to be excessively larger. If the molar ratio (C)/(B) is more than 200, the molecular weight of the produced polyoxyalkylene polyol (A2) tend to be excessively smaller.

The amount of the salen complex (B) used in the production method of the second aspect of the present invention is 0.02 to 5 parts by weight with respect to 100 parts by weight of the alkylene oxide (a). If the amount of the catalyst is excessively small, the molecular weight of the produced polyoxyalkylene polyol (A2) becomes very large, and production rate becomes low; thus, it is unfavorable. On the contrary, if the amount of the catalyst is excessively large, cost for producing the polyoxyalkylene polyol (A2) increases because the catalyst is expensive; thus it is also unfavorable.

Thus, the amount of the catalyst to be used is appropriately determined according to the desired molecular weight of the polyoxyalkylene polyol (A2) to be produced.

The amount of the salen complex (B) to be used is more preferably 0.2 to 1 part by weight with respect to 100 parts by weight of the alkylene oxide (a).

In the methods for producing crystalline polyoxyalkylene polyol (A) of the present invention, that is, the method for producing crystalline polyoxyalkylene polyol (A1) of the first aspect of the present invention, and the method for producing crystalline polyoxyalkylene polyol (A2) of the second aspect of the present invention, the catalyst can be removed by a treatment, after the ring-opening addition, with water that contains an acid such as hydrochloric acid, followed by liquid-liquid layer separation, to remove the residual catalyst.

Suitable examples of the acid include hydrochloric acid, phosphoric acid, sulfuric acid, benzoic acid and/or acetic acid.

The salen complex (B) may be immobilized on a solid carrier (D) as described later. In this case, the catalyst can be separated after the reaction from the products with a suitable acid, and easily recovered by a solid-liquid separation such as filtration.

The crystalline polyoxyalkylene polyol (A) may be obtained by, after removing the catalyst, hydrolyzing the end group of the ring-opening-addition product with an amine, a hydroxide of an alkaline metal, or the like, and, if necessary, removing a solvent from the obtained polyol.

The produced crystalline polyoxyalkylene polyol (A) may be further purified by recrystallization-precipitation from a suitable solvent (such as acetone or ethyl methyl ketone) under cooling conditions.

In view of the sharp meltability of resins such as polyurethane resins (PU), and polyester resins (PE), to be produced using the crystalline polyoxyalkylene polyol (A) as a raw-material polyol component, the isotacticity of the crystalline polyoxyalkylene polyol (A) is preferably 70% or higher, more preferably 80% or higher, still more preferably 95% or higher, and most preferably 99% or higher.

The isotacticity can be calculated in the procedure described in Macromolecules, vol. 35, No. 6, p. 2389-2392, (2002). The details are described below.

About 30 mg of a sample is weighed in a 5-mm$\phi$ sample tube for $^{13}$C-NMR. About 0.5 ml of a deuterated solvent is added in the sample tube to dissolve the sample. Thus, a test sample is prepared. The deuterated solvent is suitably selected from deuterated solvents that dissolve the sample, among deuterated chloroform, deuteration toluene, deuterated dimethyl sulfoxide, and deuterated dimethylformamide.

Signals of three methine groups in the $^{13}$C-NMR spectrum are observed near a syndiotactic value (S) of 75.1 ppm, a heterotactic value (H) of 75.3 ppm, and an isotactic value (I) of 75.5 ppm, respectively. The isotacticity is calculated by the following calculation formula (1).

$$\text{Isotacticity (\%)} = [I/(I+S+H)] \times 100 \quad (1)$$

In the formula, <I> represents an integral value of the isotactic signal; <S> represents an integral value of the syndiotactic signal; and <H> represents an integral value of the heterotactic signal.

The number average molecular weight (hereinafter, abbreviated as Mn) of the crystalline polyoxyalkylene polyol (A) produced by the production method of the first or second aspect of the present invention is 500 to 20,000. In view of the physical properties of resins such as polyurethane resins (PU), and polyester resins (PE), to be produced using the crystalline polyoxyalkylene polyol (A) as a raw-material polyol component, the Mn of the crystalline polyoxyalkylene polyol (A) is preferably 500 to 20,000, more preferably 2,000 to 20,000, and still more preferably 2,000 to 10,000.

The Mn is calculated in a common procedure by measuring a hydroxy value, or by GPC with reference to polystyrene standards.

The hydroxy value (mg KOH/g) is determined in accordance with JIS K-1557 (1970 edition). The Mn is calculated by the following calculation formula (2):

$$Mn = (F \times 56,100)/(\text{hydroxy value}) \quad (2)$$

In the formula, F represents the number of hydroxy groups contained in one molecule of the crystalline polyoxyalkylene polyol (A).

The salen complex (B) of the present invention may be used as received. Alternatively, the salen complex (B) immobilized on a solid carrier may be used. The salen complex (B) immobilized on a solid carrier is advantageous because it can be easily separated after the reaction from the reaction mixture in a reusable form. Reuse can lead to cost reduction. In addition, the salen complex (B) immobilized on the solid carrier does not leave catalyst residue in the produced polyoxyalkylene polyol (A).

The salen complex (B) may be immobilized on the solid carrier (D) via chemical bonding, or physical adsorption.

The salen complex (B) of the present invention can be immobilized on the solid carrier (D) in a method known in the art. In order to immobilize the salen complex (B) on the sold carrier, for example, the method taught in Catalysis, Vol. 7, p. 170 (published in 2006) may be used for an inorganic solid material, silica, as the solid carrier (D). The method taught in Chemistry: A European Journal, Vol. 12, No. 2, p. 576-583 (published in 2005) may be used for an organic polymer, polystyrene, as the solid carrier (D).

The solid carrier (D) of the present invention may be either an inorganic solid material, or an organic polymer.

Examples of the inorganic solid material include silica, alumina, zeolite, titanium oxide, talc, hectorite, activated carbon, boiling tips, and clay.

Examples of the organic polymer include polyethylene, polypropylene, polystyrene, polynorbornene, polyacrylic acid, polypropylene glycol, cationic exchange resins, anionic exchange resins, and copolymers thereof.

Considering the chemical stability in the reaction involved in the present invention, silica, zeolite, polystyrene, and polynorbornene are preferable, among these.

The third aspect of the present invention is crystalline polyoxyalkylene polyol (A) produced by the production method of the first or second aspect of the present invention. Crystalline polyoxypropylene polyols can be produced when the above-mentioned propylene oxide is used as the alkylene oxide (a).

The crystalline polyoxyalkylene polyol (A) of the third aspect of the present invention, that is, the crystalline polyoxyalkylene polyol (A1) produced by the production method of the first aspect of the present invention or the crystalline polyoxyalkylene polyol (A2) produced by the production method of the second aspect of the present invention as a raw material of the polymerization reaction, enables a polyurethane resin (PU), and a polyester resin (PE) with excellent sharp meltability to be produced.

The polyurethane resin (PU) of the fourth aspect of the present invention can be produced by reacting the crystalline polyoxyalkylene polyol (A) of the third aspect of the present invention with a polyisocyanate (E).

The polyisocyanate (E) is a compound having at least two isocyanato groups. Examples thereof include aromatic polyisocyanates, aliphatic polyisocyanates, alicyclic polyisocyanates, aromatic aliphatic polyisocyanates, modified compounds of these polyisocyanates (urethane group-, carbodiimido group-, allophanato group-, urea group-, biuret group-, isocyanurato group-, or oxazolidone group-containing modified compounds), and mixtures of two or more of these.

Examples of the aromatic polyisocyanate include $C_6$ to $C_{16}$ (the carbon atom in the NCO group is not included; the same applies to the polyisocyanates described below) aromatic diisocyanates, $C_6$ to $C_{20}$ aromatic triisocyanate, and crude products of these isocyanates. Specific examples thereof include 1,3- and/or 1,4-phenylene diisocyanate, 2,4- and/or 2,6-tolylene diisocyanate (TDI), crude TDI, 2,4'- and/or 4,4'- diphenylmethane diisocyanate (MDI), crude MDI [phosgenized products of crude diamino diphenyl methane {a condensation product of formaldehyde, and aromatic amine (aniline) or a mixture thereof; or a mixture of diamino diphenyl methane and a small amount (for example, 5 to 20%) of polyamines that has three or more functional groups; polyallyl polyisocyanate (PAPI) and the like], naphthylene-1,5-diisocyanate, and triphenylmethane-4,4',4''-triisocyanate.

Examples of the aliphatic polyisocyanate include $C_2$ to $C_{18}$ aliphatic diisocyanates. Specific examples thereof include 1,6-hexamethylene diisocyanate, 2,2,4-trimethyl hexamethylene diisocyanate, and lysine diisocyanate.

Examples of the alicyclic polyisocyanate include $C_4$ to $C_{16}$ alicyclic diisocyanates. Specific examples thereof include isophorone diisocyanate, 4,4'-dicyclohexylmethane diisocyanate, 1,4-cyclohexane diisocyanate, and norbornane diisocyanate.

Examples of the aromatic aliphatic polyisocyanates include $C_8$ to $C_{15}$ aromatic aliphatic diisocyanates. Specific examples thereof include xylylene diisocyanate, and $\alpha,\alpha,\alpha',\alpha'$-tetramethylxylylene diisocyanate.

Specific examples of the modified polyisocyanates include urethane-modified MDI, carbodiimide-modified MDI, sucrose-modified TDI, and castor oil-modified MDI.

Among these, the $C_6$ to $C_{16}$ aromatic diisocyanates, the $C_4$ to $C_{12}$ aliphatic diisocyanates, and $C_4$ to $C_{16}$ alicyclic diisocyanates are preferable, and the aromatic diisocyanate is more preferable. In view of the mechanical properties of the polyurethane resin to be produced, 2,4- and/or 2,6-tolylene diisocyanate (TDI), and 2,4'- and/or 4,4'-diphenylmethane diisocyanate (MDI) are particularly preferable.

The polyurethane resin (PU) of the present invention can be polymerized by a method known in the art with or without a catalyst for producing polyurethane.

Amine catalysts for producing polyurethane are optionally usable in the present invention. Such amine catalysts are the same as catalysts commonly used in polyurethane reactions. Examples thereof include triethylenediamine, N-ethylmorpholine, diethylethanolamine, N,N,N',N'-tetramethylhexamethylenediamine, triethylenediamine, 1-isobutyl-2-methylimidazole, 1,8-diazabicyclo-[5.4.0]-undecene-7, and bis(dimethylaminoethyl)ether carboxylate salt.

In addition, metal catalysts may be used, if necessary. Examples of the metal catalysts include tin (II) octylate, dibutyltin (IV) dilaurate, and lead octylate. The amount of the catalyst is preferably 0.001 to 6% of the weight of the crystalline polyoxyalkylene polyol (A), and is more preferably 0.1 to 5%.

The Mn of the polyurethane resin (PU) is normally 1,500 to 30,000, and preferably 8,000 to 20,000. If the Mn is smaller than 1,500, mechanical strength of the polyurethane resin may be deteriorated. If the Mn exceeds 30,000, processability of the polyurethane resin tends to be poor.

The Mn is determined in a common procedure by GPC with reference to polystyrene standards.

In the present invention, the sharp meltability of the polyurethane resin (PU) is determined according to the following procedures (1) and (2) described below. The sharp meltability is defined as an index—Smax—represented by the following calculation formula (4).

Procedure (1): The $<E_{(T)}>$ is defined as the tensile loss modulus at T° C. The difference $<S>$ between the tensile loss modulus at T° C. and that at (T+20)° C. is defined by the following calculation formula (3):

$$S = \text{Log} E_{(T)}'' - \text{Log} E_{(T+20)}'' \quad (3)$$

Procedure (2): The temperature $<\alpha>$ is defined as a temperature at a peak of heat of fusion. The temperature $<X>°$ C. is defined as the temperature T° C. at which the above $<S>$ is maximum within the range from $(\alpha-20)°$ C. to $(\alpha+20)°$ C. The maximum value of the $<S>$, that is, $<\text{Smax}>$ is defined according to the following calculation formula (4) as an index to evaluate the sharp meltability:

$$S\text{max} = \text{Log} E_{(X)}'' - \text{Log} E_{(X+20)}'' \quad (4)$$

In the case where the temperature $\alpha$ at a peak of heat of fusion is not observed, glass transition temperatures are adopted instead of the temperature at a peak of heat of fusion.

The larger the index or sharp meltability of polyurethane resin (PU), Smax, is, the greater the sharp meltability is. The Smax of the polyurethane resin (PU) is preferably 0.5 or more, and more preferably 0.8 or more.

For determining the sharp meltability index Smax, the temperature X° C. is determined beforehand based on a chart of the temperature and the tensile loss modulus measured with a dynamic viscoelasticity measuring device. Then, the Smax is calculated according to the calculation formula (4).

The temperature $\alpha$ at a peak of heat of fusion, and the glass transition temperature are measured in accordance with ASTM D3418-82 (by DSC method). They may be measured by, for example, a differential scanning calorimeter (for example, DSC 20, or SSC/580, products of Seiko I&E Co. Ltd.) may be used.

The tensile loss-modulus E'' may be measured with a dynamic viscoelasticity measuring apparatus (for example, dynamic viscoelasticity measuring apparatus Rheogel-E4000, a product of UBM) under a condition of a frequency of 1 Hz and a temperature-increasing rate of 4° C./min.

The polyurethane resin (PU) may be formed into polyurethane foam using a foaming agent by a method known in the art.

Examples of the foaming agent include water.

In the production process of the polyurethane resin (PU), other additives such as those described below may be further optionally added.

The reaction may be made in the presence of commonly used additives such as coloring agents (such as dyes, paints), flame retardants (such as phosphates, halogenated phosphate), antiaging agents (such as triazole compounds, benzophenone compounds), antioxidant agents (such as hindered phenol compounds, hindered amine compounds).

The polyurethane resin (PU) may be used as a coating composition. The polyurethane resin (PU) has advantageous characteristics such as excellent adhesionability to polyolefin rubber, polyolefin, or the like. Thus, the polyurethane resin (PU) may be used in various fields, for example, as polyurethane foams, polyurethane elastomers, and polyurethane coating materials. Examples of the polyurethane forms include cushion materials for vehicles, and back-supporting materials for vehicles. Examples of the polyurethane elastomers include cast-potting materials, and cleaning blades in electronic copying machines. Examples of the polyurethane coating materials include hot melt adhesives, and paints.

The polyester resin (PE) of the fifth aspect of the present invention is produced by reacting the crystalline polyoxyalkylene polyol (A) of the third aspect of the present invention with a polycarboxylic acid (F).

Examples of the polycarboxylic acid (F) include alkylene dicarboxylic acids, such as succinic acid, adipic acid, sebacic acid, and dodecenyl succinic acid; alkenylene dicarboxylic acids, such as maleic acid, and fumaric acid; and aromatic dicarboxylic acids, such as phthalic acid, isophthalic acid, terephthalic acid, and naphthalene dicarboxylate.

In view of the mechanical properties of the polyester resin to be produced, $C_4$ to $C_{20}$ alkenylene dicarboxylic acids, $C_8$ to $C_{20}$ aromatic dicarboxylic acids, and $C_6$ to $C_{21}$ alkylene dicarboxylic acids are preferable among these. Two or more of these may be used in combination.

Other examples of the polycarboxylic acid (F) include acid anhydrides of these polycarboxylic acids (F), and lower ($C_1$ to $C_4$) alkyl esters (such as methyl esters, ethyl esters, and isopropyl esters).

The polyester resin (PE) of the present invention is produced by polycondensating the crystalline polyoxyalkylene polyol (A) and the polycarboxylic acid (F) in the presence of a known esterification catalyst or the like. Here, examples of the esterification catalyst include tin-containing compounds, such as dibutyltin oxide, and dioctyltin dilaurate; titanium-containing compounds, such as titanium tetraisopropoxide, titanium tetrabutoxide, titanium triethanolaminate, and titanium diisopropoxy bistriethanolaminate; and antimony-containing compounds, such as antimony trioxide. Considering the environmental impact, the titanium compounds are preferable.

The reaction temperature is not particularly limited, but is preferably 160° C. to 280° C., more preferably 175° C. to 270° C., and still more preferably 185° C. to 260° C. The reaction proceeds at an appropriate rate at a temperature in the range of 160° C. to 280° C., and thereby the polyester resin (PE) is industrially producible.

The Mn of the polyester resin (PE) of the present invention determined by GPC is normally 1,500 to 30,000, and preferably 2,000 to 20,000. If the Mn is larger than 30,000 is not preferable in terms of industrial productivity. On the contrary, the Mn is smaller than 1,500, mechanical strength may become poor.

The Mn is calculated in a common procedure by GPC with reference to polystyrene standards.

In the present invention, the sharp meltability of the polyester resin (PE) is determined according to the following the procedures (1) and (2) described below. The sharp meltability is defined as an index—S'max—represented by the following calculation formula (6).

Procedure (1): The $<G_{(T')}''>$ is defined as the share loss modulus at 1° C. The difference $<S'>$ between the shear loss modulus at T'° C. and that at (T'+20)° C. is defined by the following calculation formula (5):

$$S' = \text{Log } G_{(T')}'' - \text{Log } G_{(T'+20)}'' \quad (5)$$

Procedure (2): The temperature $<\alpha'>$ is defined as a temperature at a peak of heat of fusion. The temperature $<X>$° C. is defined as the temperature T° C. at which the above $<S'>$ is maximum within the range from $(\alpha'-20)$° C. to $(\alpha'+20)$° C. The maximum value of the $<S'>$, that is, $<S'\text{max}>$ is defined according to the following calculation formula (6) as an index to evaluate the sharp meltability:

$$S'\text{max} = \text{Log } G_{(X')}'' - \text{Log } G_{(X'+20)}'' \quad (6)$$

In the case where a temperature $\alpha'$ at a peak of heat of fusion is not observed, glass transition temperatures are adopted instead of the temperature at a peak of heat of fusion. The larger the index or sharp meltability of polyester resin (PE), S'max, is, the greater the sharp meltability is. S'max of the polyester resin (PE) is preferably 3 or more, and more preferably 4 or more.

For determining the sharp meltability index—S'max—of the polyester resin, the temperature X'° C. is determined beforehand in the same procedure as described above based on a chart of the temperature and the shear loss modulus measured with a dynamic viscoelasticity measuring device. Then, the S'max is calculated according to the calculation formula (6).

The temperature α at a peak of heat of fusion, and the glass transition temperature are measured in a similar manner to the procedure as described above for the polyurethane resin (PU).

The shear loss modulus G'' is measured with a dynamic viscoelasticity measuring apparatus under a condition of a frequency of 1 Hz, a temperature-increasing rate of 10° C./min, and strain of 5%.

When the polyester resin (PE) is blended with another polyester resin, compatibility therebetween is excellent because the both are polyester resins. Thus, the polyester resin (PE) blended with another resin can be used in various applications such as a resin for toners, and a resin for paint compositions.

Effects of the Invention

The production method of the present invention provides a highly reactive crystalline polyoxyalkylene polyol having a remarkably high isotacticity and a comparatively low molecular weight at low cost. The method also provides a crystalline polyoxyalkylene polyol for producing a polyurethane resin, and a polyester resin which are excellent in sharp meltability, at low cost.

Specifically, the production cost can be further decreased by immobilizing the complex catalyst on a solid carrier, whereby the complex catalyst immobilized on the solid carrier is recoverable.

BEST MODE FOR CARRYING OUT THE INVENTION

Hereinafter, the present invention is described in detail by way of examples. However, the present invention is not limited to these examples.

PRODUCTION EXAMPLE 1

Synthesis of Salen Catalyst (B-1)

A one-liter eggplant flask equipped with a reflux condenser was charged with 10.8 g (100 mmol) of 1,2-diamino benzene, 50 g (213 mmol) of 3,5-di-t-butyl salicylaldehyde, and 400 mL of ethanol under nitrogen atmosphere. After 4-hour reflux under stirring, the obtained mixture was left for 24 hours at a room temperature, and then filtrated to recover yellow solid. The yellow solid was washed three times with each 50 mL of ethanol. The resultant solid was vacuum-dried for 24 hours to give 41 g of a yellow crystalline intermediate (X1-1) (75 mmol, yield: 75%). The intermediate was identified by H-NMR, and C-NMR.

A one-liter eggplant flask equipped with a reflux condenser was charged with 40 g (73 mmol) of the intermediate (X1-1), 13.1 g (52 mmol) of cobalt acetate tetrahydrate, and 500 mL of ethanol under nitrogen atmosphere. After 2-hour reflux under stirring, the mixture was cooled to a room temperature. The precipitated solid was recovered by vacuum filtration, and washed three times with each 50 mL of methanol. The solid was dissolved in 40 mL of dichloromethane, and 500 mL of hexane was further added to the obtained solution. Then, the resultant mixture was cooled to 0° C., and left for 24 hours. The precipitated solid was recovered by vacuum filtration, and washed three times with each 20 ml of hexane to give 29 g (48.4 mmol, yield: 93%) of an intermediate (X1-2) in a dark red crystalline form. The intermediate was identified by mass spectrometry (hereinafter, abbreviated as MS).

A 500-mL beaker was charged with 27.2 g (45.1 mmol) of the intermediate (X1-2), 2.58 mL (45.1 mmol) of acetic acid, and 200 mL of dichloromethane. The mixture was stirred in the air for 4 hours. After removing the solvent with a rotary evaporator, the residue was suspended in 100 mL of pentane. The suspension was subjected to vacuum filtration. The residue was washed three times with each 20 ml of pentane to give 29 g (45.7 mmol, yield: 97%) of the salen complex (B-1) of the present invention in a red-brown crystalline form. The salen complex was identified by MS.

PRODUCTION EXAMPLE 2

Synthesis of Salen Complex (B-2) Immobilized on Silica

A 500-mL eggplant flask equipped with a reflux condenser was charged with 10 g of porous silica (SILFAM-A, a product of Nippon Chemical Industrial Co., Ltd.), 5.7 g (25.8 mmol) of 3-aminopropyltriethoxysilane, and 200 mL of dehydrated toluene under nitrogen atmosphere. After 6-hour reflux under stirring, the resulting mixture was cooled and filtrated to give white powder. The white powder was washed five times with each 50 mL of hot methanol. The obtained solid was vacuum-dried for 24 hours to yield 10 g of white intermediate (X2-1). The intermediate was identified by determining the nitrogen atom content by fluorescence X-rays.

A 500-mL beaker was charged with 10 g of the intermediate (X2-1), 5.3 g (25.8 mmol) of 2,6-diformyl-4-t-butylphenol, and 200 mL of dehydrated ethanol under nitrogen atmosphere. After 10-hour reflux under stirring, the resulting mixture was cooled, and filtrated to give yellow solid. The yellow solid was washed five times with each 50 mL of hot methanol. The obtained yellow powder was vacuum-dried for 24 hours to yield 10.7 g of yellow intermediate (X2-2). The intermediate was identified by determining the nitrogen atom content by fluorescence X-rays.

A 500-mL eggplant flask equipped with a reflux condenser was charged with 5.4 g (50 mmol) of 1,2-diaminobenzene, 11.7 g (50 mmol) of 3,5-di-t-butyl salicylaldehyde, and 200 mL of ethanol under nitrogen atmosphere. After 4-hour reflux under stirring, the solvent was removed with a rotary evaporator. The yellow powdery residue was washed three times with each 10 mL of ethanol. The obtained solid was vacuum-dried for 24 hours, to yield 13.6 g of yellow crystal intermediate (X2-3) (42 mmol, yield: 84%). The intermediate was identified by H-NMR.

A 500-mL eggplant flask equipped with a reflux condenser was charged with 10 g of the intermediate (X2-2), 8.4 g (25.8 mmol) of the intermediate (X2-3), and 200 mL of dehydrated ethanol under nitrogen atmosphere. After 18-hour reflux under stirring, the resulting mixture was cooled and filtrated, to give a yellow powder. The yellow powder was washed five times with each 50 mL of hot methanol. The obtained solid was vacuum-dried for 24 hours, to yield 12.1 g of yellow intermediate (X2-4). The intermediate was identified by determining the nitrogen atom content with fluorescence X-rays.

A 500-mL eggplant flask equipped with a reflux condenser was charged with 10 g of the intermediate (X2-4), 6.4 g (25.8 mmol) of cobalt acetate tetrahydrate, and 200 mL of ethanol under nitrogen atmosphere. After 2-hour reflux under stirring, the resulting mixture was cooled and filtrated, to give a light green powder. The light green powder was washed five times with each 50 mL of hot methanol. Then, the obtained solid was vacuum-dried for 24 hours to yield 10 g of a light green intermediate (X2-5). The intermediate was identified by determining the cobalt atom content by fluorescence X-rays.

A 500-mL beaker was charged with 10 g of the intermediate (X2-5), 1.48 mL (25.8 mmol) of acetic acid, and 200 mL of dichloromethane. The mixture was stirred in the air for 4 hours. The obtained suspension was subjected to vacuum filtration, and the residue was washed five times with each 20 ml of pentane to give powder. The obtained powder was vacuum-dried for 24 hours, to yield 10 g of a greenish white salen complex (B-2) of the present invention, which was immobilized on silica. The salen complex was identified by determining the cobalt atom content by fluorescence X-rays. The cobalt atom content of the salen complex (B-2) immobilized on silica was 2.29% by weight.

COMPARATIVE PRODUCTION EXAMPLE 1

Synthesis of Bimetallic μ-Oxoalkoxide Hydroxy Catalyst (E-1)

A 300-mL eggplant flask equipped with a distiller was charged with 450 mg (2.45 mmol) of zinc acetate, 1.0 g (5.0 mmol) of triisopropylaluminum, and 20 mL of decalin under nitrogen atmosphere. The mixture was refluxed for 4 hours while removing generated isopropylacetic acid. Decalin was removed from the resultant reaction solution, and the residue was re-dissolved in 10 mL of n-heptane. To the obtained solution, with 100 g of polypropylene glycol (OH value: 121 mg KOH/g) was added, and the resulting mixture was heated at 130° C. for 4 hours under stirring under reduced pressure, to give 101.1 g of a bimetallic μ-oxoalkoxide hydroxy compound (E-1), which contained zinc and aluminum, for Comparative Example.

Following Examples and Comparative Examples were performed using the complex (B-1) or the salen complex (B-2), which is immobilized on silica, of the present invention, or the bimetallic μ catalyst (E-1) for Comparative Example.

EXAMPLE 1

A one-liter eggplant flask was charged with 2.3 g (3.47 mmol) of the salen complex (B-1) produced in Production Example 1, 20.8 g (347 mmol) of acetic acid, 114 g (1.97 mol) of racemic propylene oxide, and 300 mL of toluene under nitrogen atmosphere. Then the mixture was stirred at 0° C. for 6 hours. After completion of the reaction, 250 mL of 0.1 N hydrochloric acid was added to produce precipitate. To the precipitate, 200 mL of dichloromethane was added to dissolve the precipitate, followed by liquid-liquid layer separation to separate the organic layer. The solvent was removed from the organic layer with a rotary evaporator, whereby solid matter was precipitated. The solid was dissolved in 200 mL of acetone at 40° C. Subsequently, the obtained solution was cooled to 0° C. over 24 hours. The solution was filtrated via vacuum filtration, to give white solid. To the white solid, 500 mL of 0.1 N KOH-methanol solution was added, and the resulting mixture was stirred at 80° C. for 2 hours. Thereafter, the solution was neutralized with 0.1 N hydrochloric acid. Then, 500 mL of toluene and 1 L of water was added thereto, and the resulting mixture was separated via liquid-liquid layer separation. The layer separation was repeated three times. The solvent was removed from the separated organic layer with a rotary evaporator, to give 112 g of crystalline polypropylene oxide polyol (A-1) of the present invention.

The obtained polyol had an isotacticity of 99%, a number average molecular weight (Mn) of 2,600, and a melting point of 54° C. The yield was 98%.

EXAMPLE 2

Crystalline polypropylene oxide polyol (A-2) of the present invention (110 g) was produced in the same manner as in Example 1, except that the amount of acetic acid was changed from 20.8 g (347 mmol) to 2.1 g (34.7 mmol). The obtained polyol had an isotacticity of 99%, a number average molecular weight (Mn) of 9,800, and a melting point of 60° C. The yield was 96%.

EXAMPLE 3

A one-liter eggplant flask was charged with 8.9 g (cobalt content: 3.47 mmol) of the salen complex (B-2) immobilized on silica produced in Production Example 2, 20.8 g (347 mmol) of acetic acid, 114 g (1.97 mol) of racemic propylene oxide, and 300 mL of toluene under nitrogen atmosphere. Then the resulting mixture was stirred at 0° C. for 6 hours.

In order to recover the used salen complex (B-2) immobilized on silica, 2.1 g of acetic acid was added to the suspension after the reaction, and the obtained mixture was stirred for 30 minutes. Then, the mixture was subjected to vacuum filtration to separate the salen complex (B'-2) immobilized on silica from the reaction solution.

The solvent was removed from the organic layer by a rotary evaporator to precipitate solid. The solid was dissolved in 200 mL of acetone at 40° C. The solution was cooled to 0° C. over 24 hours and then subjected to vacuum filtration to give white solid. To the white solid, 500 mL of 0.1 mol/L KOH-methanol solution was added, and the resulting mixture was stirred at 80° C. for 2 hours. Thereafter, the solution was neutralized with 0.1 mol/L hydrochloric acid. Then, 500 mL of toluene and 1 L of water was added thereto, and the resulting mixture was separated via liquid-liquid layer separation. This procedure was repeated three times. The solvent was removed from the organic layer with a rotary evaporator to give 105 g of crystalline polypropylene oxide polyol (A-3) of the present invention. The obtained polyol had an isotacticity of 99%, a number average molecular weight (Mn) of 2,700, and a melting point of 55° C. The yield was 92%.

EXAMPLE 4

The salen complex (B'-2) immobilized on silica recovered after the reaction in Example 3 was dried under reduced pressure at room temperature to reactivate the activity. The procedure of Example 3 was repeated using the same amount of the reactivated salen complex (B'-2) as in Example 3, to give 110 g of crystalline polypropylene oxide polyol (A-4). The obtained polyol had an isotacticity of 99%, a number average molecular weight (Mn) of 2,800, and a melting point of 54° C. The yield was 96%.

EXAMPLE 5

Polypropylene oxide polyol (A-5) (100 g) was produced in the same manner as in Example 1, except that acetic acid was not used, 22.8 g (34.7 mmol) of the salen complex (B-1) was used, and the liquid-liquid layer separation process was repeated six times. The obtained polyol had an isotacticity of 99%, a number average molecular weight (Mn) of 2,900, and a melting point of 56° C. The yield was 88%.

COMPARATIVE EXAMPLE 1

Crystalline polypropylene oxide polyol (A'-1) (102 g) was produced in the same manner as in Example 1, except that acetic acid was not used. The obtained polyol had an isotacticity of 99%, a number average molecular weight (Mn) of 34,500, and a melting point of 66° C. The yield was 89%.

COMPARATIVE EXAMPLE 2

A 1-L autoclave was charged with 2.3 g of the bimetal μ-oxoalkoxide hydroxy compound (E-1) produced in Comparative Production Example 1, 114 g (1.97 mol) of racemic propylene oxide, and 300 mL of toluene under nitrogen atmosphere. The resulting mixture was stirred under pressurized condition of 0.3 MPa at 130° C. for 6 hours. Upon adding 250 mL of 0.5 mol/L hydrochloric acid thereto, precipitate was generated. The precipitate was dissolved in 200 mL of dichloromethane. Then, the resulting mixture was separated via liquid-liquid layer separation. The solvent was removed from the organic layer with a rotary evaporator. The precipitated solid residue was dissolved in 200 mL of acetone at 40° C., and then cooled to 0° C. over 24 hours, to give white solid. The white solid was subjected to vacuum filtration, to give 108 g of crystalline polypropylene oxide polyol (A'-2). The obtained polyol had an isotacticity of 68%, a number average molecular weight (Mn) of 5,200, and a melting point of 55° C. The yield was 95%.

The results of above Examples 1 to 5, and Comparative Examples 1 and 2 are illustrated in Table 1.

TABLE 1

| | Catalyst | Added amount of Catalyst (with respect to 100 parts of propylene oxide) (parts) | Added amount of acid (with respect to 100 parts of salen complex) (mol %) | Mn | Isotacticity (%) | Yield (%) |
| --- | --- | --- | --- | --- | --- | --- |
| Example 1 | Salen (B-1) | 2 | 100 | 2,600 | 99 | 98 |
| Example 2 | Salen (B-1) | 2 | 10 | 9,800 | 99 | 96 |
| Example 3 | Salen immobilized on silica (B-2) | 2 | 100 | 2,700 | 99 | 92 |
| Example 4 | Recovered salen immobilized on silica (B'-2) | 2 | 100 | 2,800 | 99 | 96 |

TABLE 1-continued

|  | Catalyst | Added amount of Catalyst (with respect to 100 parts of propylene oxide) (parts) | Added amount of acid (with respect to 100 parts of salen complex) (mol %) | Mn | Isotacticity (%) | Yield (%) |
| --- | --- | --- | --- | --- | --- | --- |
| Example 5 | Salen (B-1) | 20 | No addition | 2,900 | 99 | 88 |
| Comparative Example 1 | Salen (B-1) | 2 | No addition | 34,500 | 99 | 89 |
| Comparative Example 2 | Bimetal (E-1) | 2 | No addition | 5,200 | 68 | 95 |

EXAMPLE 6

A one-liter eggplant flask was charged with 65.99 g (23.57 mmol) of the crystalline polypropylene oxide polyol (A-4) produced in Example 4, 8.08 g (130.3 mmol) of ethylene glycol, 39.23 g (156.9 mmol) of 4,4'-diphenylmethane diisocyanate, 0.0069 g of dibutyl tin (IV) dilaurylate, 325 g of N,N-dimethylformamide (DMF) under nitrogen atmosphere. The mixture was stirred at 60° C. for 16 hours, to give a solution of polyurethane resin (PU-1), which had an Mn of 20,000 (determined by GPC based on polystyrene standard; hereinafter, the number average molecular weights were determined in the same manner). The peak temperature of the amount of heat of fusion of the polyol was 52° C.

EXAMPLE 7

A 500-mL reaction vessel equipped with a cooling pipe, a stirrer, and a nitrogen inlet was charged with 88.7 g (31.7 mmol) of the crystalline polypropylene oxide polyol (A-4) produced in Example 4, 4.0 g (24.1 mmol) of terephthalic acid, 0.8 g (4.82 mmol) of isophthalic acid, and 0.2 g of dibutyltin as a condensation catalyst, and the reaction was kept proceeded for 6 hours by heating at 210° C. under a nitrogen flow while removing generated water.

Subsequently, the reaction was allowed to proceed under a reduced pressure of 1 to 3 kPa. When the acid value reached 5, the reaction product was taken out of the reaction vessel. Then, the product was cooled to room temperature, followed by crushing, to give polyester resin composition (PE-1) of the present invention. The polyester resin (PE-1) had an Mn of 6,710 and a temperature at a peak of heat of fusion of 55° C.

COMPARATIVE EXAMPLE 3

A solution of polyurethane resin (PU'-1), which had an Mn of 20,000, was obtained in the similar polymerization way to Example 5, except that 68.91 g (22.97 mmol) of a normal polypropylene oxide polyol (NEWPOL PP3000, Mn: 3,000, hydroxy value: 37.4, a product of Sanyo Chemical Industries, Ltd., isotacticity: 25%) was used instead of the crystalline polypropylene oxide polyol (A-4), and that the charged amount of ethylene glycol was changed to 8.11 g (130.8 mmol). The glass transition temperature of the polyurethane resin (PU'-1) was 56° C.

COMPARATIVE EXAMPLE 4

A 500-mL reaction vessel equipped with a cooling pipe, a stirrer, and a nitrogen inlet was charged with 45.6 g of PO 2-mol adduct of bisphenol A, 32.1 g (93.3 mmol) of bisphenol A-EO 2-mol adduct, 24.7 g (149 mmol) of terephthalic acid, and 0.3 g of tetrabutoxy titanate. The reaction was kept proceeded for 5 hours at 230° C. under a nitrogen flow while removing generated water. Then, the reaction was further continued under a reduced pressure of 1 to 3 kPa. The reaction product was cooled to 180° C. at the time when the acid value reached 2. To the product, 7.4 g (38.5 mmol) of trimellitic anhydride was added, and the reaction was further proceeded for 2 hour under an ordinary pressure in a sealed environment. Thereafter, the reaction product was taken out of the reaction vessel, and cooled to a room temperature, followed by crushing, to give polyester resin (PE'-1) for comparison. The polyester resin (PE'-1) had an Mn of 3,500, and a glass transition temperature of 55° C.

Polyurethane resin sheets were formed from the polyurethane resin solutions of Example 6 and Comparative Example 3 as follows.

(1) Each of DMF solutions containing the respective polyurethane resins obtained above was diluted with DMF so that final resin concentration should be 20% by weight.

(2) A 200 mm×200 mm silicone resin frame was formed on a glass plate, and the diluted DMF solution of the polyurethane resin was poured into the frame to a depth of 1 mm.

(3) The glass plate was placed into an air circulating drying oven at 60° C. to vaporize most of DMF. Then, DMF was completely vaporized over 3 hours in a vacuum oven at 60° C. under a reduced pressure of 1 kPa.

<Measurement of the Temperature at a Peak of Heat of Fusion, or Glass Transition Temperature>

The peak temperature of the amount of heat of fusion and the glass transition temperature of the polyurethane resin sheets and the polyester resins were measured in accordance with the method described in ASTM D3418-82.

With respect to the polyurethane resin sheet from the polyurethane resin solution (PU-1), and the polyester resin (PE-1), only the temperature at a peak of heat of fusion was determined.

With respect to the polyurethane resin sheet from the polyurethane resin solution (PU'-1), and the polyester resin (PE'-1), the glass transition temperature was determined but the temperature at the peak of heat of fusion could not be determined.

<Measurement of Tensile Loss Modulus of Polyurethane Resin>

The tensile loss modulus was measured on the obtained polyurethane resin sheets with a dynamic viscoelasticity measuring apparatus (a product of UBM, dynamic viscoelasticity measuring apparatus Rheogel-E4000) under conditions of frequency of 1 Hz, and a temperature increasing rate of 4° C./min.

<Measurement of Shear Loss Modulus of Polyester Resin>

The shear loss modulus was measured on the obtained polyester resins with a dynamic viscoelasticity measuring device (a product of Rheometric Scientific; dynamic viscoelasticity measuring device RDS-2) under conditions of frequency of 1 Hz, a temperature increasing rate of 10° C./min, and strain of 5%.

<Sharp Meltability>

Based on a chart obtained by measuring the tensile loss modulus, and the shear loss modulus, the temperature X at which S represented by the calculation formula (3) was maximum, and the temperature X' at which S' represented by the calculation formula (5) was maximum were determined.

Based on X and X', the sharp meltability indexes Smax, and S'max were calculated by the calculation formula (4), and the calculation formula (6), respectively.

The results of Examples 6 and 7, and Comparative Examples 3 and 4 are illustrated in Table 2.

TABLE 2

| | Temperature at a | | Polyurethane resin | | Polyester resin | |
|---|---|---|---|---|---|---|
| | peak of heat of fusion (° C.) | Glass transition temperature (° C.) | X (° C.) | Sharp meltability [Smax] | X' (° C.) | Sharp meltability [S'max] |
| Example 6 | 52 | — | 42 | 1.0 | — | — |
| Example 7 | 55 | — | — | — | 55 | 5.2 |
| Comparative Example 3 | — | 56 | 36 | 0.2 | — | — |
| Comparative Example 4 | — | 55 | — | — | 60 | 2.2 |

In Examples 1 and 2, the method of the present invention, which includes performing ring-opening polymerization of the common propylene oxide in the presence of both of the salen complex (B-1) and acetic acid, gave relatively low-molecular-weight polyoxypropylene polyols having an isotacticity of 99% or higher, and reduced the amount of the salen complex to be used.

Example 3, in which a polyoxypropylene polyol had been produced in the presence of both of the salen complex (B-2) immobilized on silica, and acetic acid, and Example 4, in which the polyoxypropylene polyol produced in the presence of the salen complex (B'-2), which had been reactivated through the easy acetic acid treatment on the immobilized catalyst, and acetic acid, provided polyoxypropylene polyols which had an isotacticity of 99% or higher as well as a relatively low Mn in a range of from 2,000 to 3,000. These polyoxypropylene polyols are suitable for raw materials of diol components of polyurethane resins, and the like.

In Example 5, use of 20% by weight of the salen catalyst provided a polyoxypropylene polyol having a comparatively low molecular weight and an isotacticity of 99% or higher.

On the contrary, Comparative Example 1, in which ring-opening polymerization was performed in the presence of only a small amount of the salen complex but in the absence of acetic acid, only provided the polyoxypropylene polyol having a molecular weight of as high as 34,500. Namely, it was impossible in Comparative Example 1 to produce a polyoxypropylene polyol having a molecular weight in a range of from 2,000 to 3,000, which is suitable for a polyol material.

The polyurethane resin (PU-1) produced using the crystalline polyoxypropylene polyol (A-4) of the present invention as a raw material in Example 6 had excellent sharp meltability.

The polyester resin (PE-1) produced using the crystalline polyoxypropylene polyol (A-4) of the present invention as a raw material in Example 7 also had excellent sharp meltability.

On the contrary, the polyurethane resin (PU'-1) produced using a polyoxyalkylene polyol having low isotacticity as a raw material instead of the crystalline polyoxypropylene polyol did not show sharp meltability. The polyester resin (PE'-1) produced using a non-crystalline polyol as a raw material instead of the crystalline polyoxypropylene polyol did not show sharp meltability.

INDUSTRIAL APPLICABILITY

The production method of the present invention provides a crystalline polyoxyalkylene polyol (A) at low cost, and facilitates control of the molecular weight of the crystalline polyoxyalkylene polyol (A). A thus-produced crystalline polyoxyalkylene polyol can be used as a raw material of a polyurethane resin, a polyester resin, and the like. The polyurethane resin, and the polyester resin of the present invention have high sharp meltability, and thereby can be widely used as cleaning blades in electronic copying machines, hot melt adhesives, paints, molding compositions such as slash molding materials, powdery paints, and toners for electrophotography, or the like.

The invention claimed is:

1. A polyester resin (PE) produced via reaction of a crystalline polyoxyalkylene polyol, and a polycarboxylic acid (F), the crystalline polyoxyalkylene polyol having a number average molecular weight of 500 to 20,000 and produced by a method comprising:

performing ring-opening polymerization of an alkylene oxide (a) with a salen complex used as a catalyst (B) in a condition that an amount of the salen complex is 6 to 100 parts by weight with respect to 100 parts by weight of said alkylene oxide (a), the salen complex being represented by the formula (1):

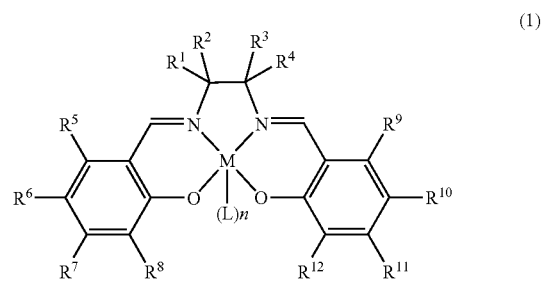

wherein $R^1$ to $R^4$ each independently represent a hydrogen atom, or an aliphatic, alicyclic, aromatic, or aromatic aliphatic hydrocarbon group, or a halogen atom, or any pair of the $R^1$ to $R^4$ may be linked together to form a ring;

a hydrogen atom or hydrogen atoms bonded to a carbon atom in the hydrocarbon group may be substituted or unsubstituted;

$R^5$ to $R^{12}$ each independently represent a hydrogen atom, or an aliphatic, alicyclic, aromatic, or aromatic aliphatic hydrocarbon group, or a halogen atom, or any adjacent pair of the $R^5$ to $R^{12}$ may be linked together to form a ring; a hydrogen atom or hydrogen atoms bonded to a carbon atom in the hydrocarbon group may be substituted or unsubstituted;

M represents a metal atom belonging to any one of groups III to XIII;

L represents a ligand;

n represents an integer of 1 or 2, and when n is 2, one ligand L of two Ls may be the same as or different from the other, or the formula (2):

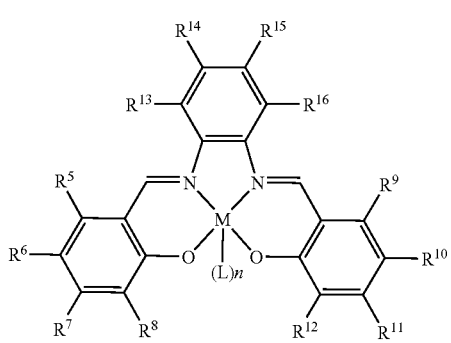

(2)

wherein $R^{13}$ to $R^{16}$ each independently represent a hydrogen atom, or an aliphatic, alicyclic, aromatic, or aromatic aliphatic hydrocarbon group, or a halogen atom, or any pair of the $R^{13}$ to $R^{16}$ may be linked together to form a ring; a hydrogen atom or hydrogen atoms bonded to a carbon atom in the hydrocarbon group may be substituted or unsubstituted; and $R^5$ to $R^{12}$, M, L, and n represent the same as defined for the formula (1).

2. The polyester resin (PE) according to claim 1, wherein the isotacticity of the crystalline polyoxyalkylene polyol is 95% or higher.

3. The polyester resin (PE) according to claim 1, wherein the crystalline polyoxyalkylene polyol is a crystalline polyoxypropylene polyol.

4. The polyester resin (PE) according to claim 1, wherein the salen complex (B) is immobilized on a solid carrier (D).

5. The polyester resin (PE) according to claim 4, wherein said solid carrier (D) is an inorganic solid material, or an organic polymer.

6. A polyester resin (PE) produced via reaction of a crystalline polyoxyalkylene polyol, and a polycarboxylic acid (F), the crystalline polyoxyalkylene polyol having a number average molecular weight of 500 to 20,000 and produced by a method comprising:

performing ring-opening polymerization of an alkylene oxide (a) in the presence of a salen complex (B), and an acid (C), wherein a molar ratio (C)/(B) of said acid (C) to said salen complex (B) is 0.1 to 200, and the salen complex (B) being represented by the formula (1):

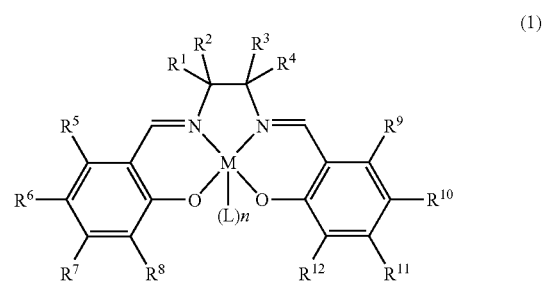

(1)

wherein $R^1$ to $R^4$ each independently represent a hydrogen atom, or an aliphatic, alicyclic, aromatic, or aromatic aliphatic hydrocarbon group, or a halogen atom, or any pair of the $R^1$ to $R^4$ may be linked together to form a ring; a hydrogen atom or hydrogen atoms bonded to a carbon atom in the hydrocarbon group may be substituted or unsubstituted;

$R^5$ to $R^{12}$ each independently represent a hydrogen atom, or an aliphatic, alicyclic, aromatic, or aromatic aliphatic hydrocarbon group, or a halogen atom, or any adjacent pair of the $R^5$ to $R^{12}$ may be linked together to form a ring; a hydrogen atom or hydrogen atoms bonded to a carbon atom in the hydrocarbon group may be substituted or unsubstituted;

M represents a metal atom belonging to any one of groups III to XIII;

L represents a ligand;

n represents an integer of 1 or 2, and when n is 2, one ligand L of two Ls may be the same as or different from the other, or the formula (2):

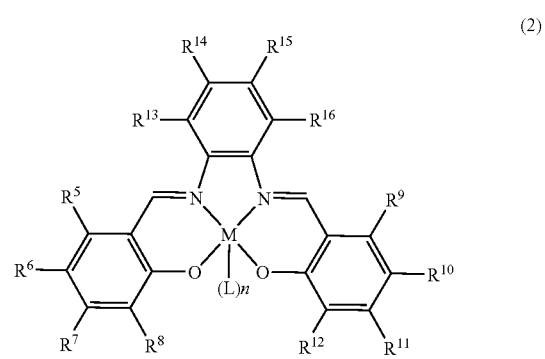

(2)

wherein $R^{13}$ to $R^{16}$ each independently represent, a hydrogen atom, or an aliphatic, alicyclic, aromatic, or aromatic aliphatic hydrocarbon group, or a halogen atom, or any pair of the $R^{13}$ to $R^{16}$ may be linked together to form a ring; a hydrogen atom or hydrogen atoms bonded to a carbon atom in the hydrocarbon group may be substituted or unsubstituted; and $R^5$ to $R^{12}$, M, L, and n represent the same as defined for the formula (1).

7. The polyester resin (PE) according to claim 6, wherein 0.02 to 5 parts by weight of said salen complex (B) is used with respect to 100 parts by weight of the alkylene oxide (a).

8. The polyester resin (PE) according to claim 6, wherein said acid (C) is an organic acid.

9. The polyester resin (PE) according to claim 6, wherein the isotacticity of the crystalline polyoxyalkylene polyol is 95% or higher.

10. The polyester resin (PE) according to claim 6, wherein the crystalline polyoxyalkylene polyol is a crystalline polyoxypropylene polyol.

11. The polyester resin (PE) according to claim 6, wherein the salen complex (B) is immobilized on a solid carrier (D).

12. The polyester resin (PE) according to claim 11, wherein said solid carrier (D) is an inorganic solid material, or an organic polymer.

* * * * *